United States Patent [19]
Yokoe et al.

[11] Patent Number: 5,284,810
[45] Date of Patent: Feb. 8, 1994

[54] DIELECTRIC CERAMIC COMPOSITION

[75] Inventors: Nobuo Yokoe; Hitoshi Ohkoda; Hiroshi Kikuyama, all of Kokubu, Japan

[73] Assignee: Kyocera Corporation, Kyoto, Japan

[21] Appl. No.: 905,005

[22] Filed: Jun. 26, 1992

[30] Foreign Application Priority Data

Jun. 27, 1991 [JP] Japan .................. 3-156827

[51] Int. Cl.$^5$ .................................. C04B 35/50
[52] U.S. Cl. .................. 501/135; 501/138; 501/139
[58] Field of Search ............. 501/135, 138, 139, 152

[56] References Cited

U.S. PATENT DOCUMENTS 4,542,107 9/1985 Kato et al. .................. 501/135
4,753,905 6/1988 Nishioka et al. ............. 501/135

FOREIGN PATENT DOCUMENTS 0050509 4/1980 Japan .................. 501/135

Primary Examiner—Karl Group
Assistant Examiner—Deborah Jones
Attorney, Agent, or Firm—Spensley Horn Jubas & Lubitz

[57] ABSTRACT

When the ratio of a dielectric ceramic composition is expressed as $xPb(Mg_{\frac{1}{3}}Nb_{\frac{2}{3}})O_3$—$yPb(Zn_{\frac{1}{3}}Nb_{\frac{2}{3}})O_3$—$zPb(Sm_{\frac{1}{2}}Nb_{\frac{1}{2}})O_3$, the values x, y and z are set to lie inside the coordinates A, B, C, D, E (but excluding the segment AE) in a triangular diagram of FIG. 1, and wherein $BaTiO_3$ is added thereto at a ratio of smaller than 10 mol % and $MnO_2$ is further added thereto at a ratio of from 0.01 to 0.6% by weight. There is obtained a dielectric ceramic which has a high dielectric constant, a low dissipation factor, a temperature more stable of dielectric constant, a good ceramic density and ceramic strength and that can be baked at a low temperature, and that are usable to MLCCS using Ag-Pd electrodes.

3 Claims, 1 Drawing Sheet

DIELECTRIC CERAMIC COMPOSITION

BACKGROUND OF THE INVENTION

1. Field of the Invention

The present invention relates to a dielectric ceramic composition having a high dielectric constant and a small temperature dependence thereof, and particularly to a composition adapted to a multi layered ceramic capacitor (MLCC) having a large capacitance.

2. Description of the Prior Art

The dielectric ceramic material composed of $BaTiO_3$ as a main component has heretofore been used for MLCC which, however, has recently been replaced by a new dielectric ceramic material, i.e., replaced by a composition of $Pb(FeNdNb)O_3$ having a perovskite structure that can be fired at a low temperature and has a large dielectric constant (Japanese Laid-Open Patent Publication No. 216106/1987). This dielectric ceramic material allows the use of a cheaply available silver-palladium type of electrode material for firing at low temperatures instead of using expensive Pd that was used so far, makes it possible to roughly double the dielectric constant compared with the case of using a material which is chiefly composed of $BaTiO_3$ and, hence, makes it possible to increase the capacitance and, further, to decrease the number of dielectric layers if the same capacitance is to be obtained enabling the size to be reduced.

The above-mentioned conventional dielectric ceramic material exhibits a dielectric constant that greatly changes depending upon the temperature; e.g., the dielectric constant changes over a temperature range of, for example, from $-30°$ C. to $85°$ C. by as greatly as $+15\%$ to $-75\%$ compared with the dielectric constant at room temperature. That is, the dielectric ceramic material exhibits properties that are inferior to those of the generally used tantalum electrolytic capacitors placed in the market of large-capacitance capacitors, and poses a bottleneck against being put into practical use.

The object of the present invention therefore is to provide a dielectric ceramic composition which exhibits a high dielectric constant that varies little depending upon the temperature, and has a high mechanical strength.

SUMMARY OF THE INVENTION

The dielectric ceramic composition of the present invention was accomplished based on a discovery that a high dielectric constant and an improved mechanical strength are obtained if $Pb(Sm_\frac{1}{2}Nb_\frac{1}{2})O_3$ and $Pb(Zn_\frac{1}{3}Nb_\frac{2}{3})O_3$ are added to $Pb(Mg_\frac{1}{3}Nb_\frac{2}{3})O_3$, that purity of crystals and insulating properties are improved if $BaTiO_3$ is added to the above system, and that the temperature dependence of the dielectric contant is decreased if $MnO_2$ is added thereto.

That is, the present invention is concerned with a composition comprising $Pb(Mg_\frac{1}{3}Nb_\frac{2}{3})O_3$, $Pb(Zn_\frac{1}{3}Nb_\frac{2}{3})O_3$ and $Pb(Sm_\frac{1}{2}Nb_\frac{1}{2})O_3$ as three chief components, wherein when the composition thereof is represented by the general formula (1)

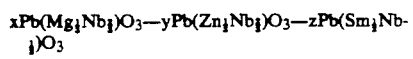

(wherein $x+y+z=1$)     (1)

the values x, y and z lie inside a region linked by the following coordinates A, B, C, D and E (but excluding the segment AE) in a triangular diagram of FIG. 1, A (0.769, 0.231, 0),
B (0.706, 0.212, 0.082),
C (0.399, 0.517, 0.084),
D (0.282, 0.658, 0.060),
E (0.417, 0.583, 0)

and wherein $BaTiO_3$ is added at a ratio of smaller than 10 mol% to the above system. Moreover, $MnO_2$ is added at a ratio of 0.01 to 0.6% by weight to the above system in order to improve temperature properties.

Referring to the triangular diagram of FIG. 1 in which the composition comprising the chief components of the present invention lies within a region surrounded by the coordinates A, B, C, D and E, the ceramic density after firing decreases and the capacitance greatly changes depending upon the temperature when the value x is greater than the segment AB. When the value z is greater than the segment BC or the segment CD, the dielectric constant k becomes smaller than 4000 making it difficult to obtain a ceramic composition having a high dielectric constant. When the segment DE is exceeded, i.e., when the value x is great and the value y is small, the dielectric constant k becomes smaller than 4000 making it difficult to carry out the sintering. On the segment AE, i.e., when the value z is O, the breaking mode takes place on the grain boundary mode and the ceramic strength decreases greatly.

According to the composition of the present invention, $BaTiO_3$ can be added in the form of a solid solution to the chief components represented by the above general formula (1). In this case, the whole composition is represented by the general formula (2),

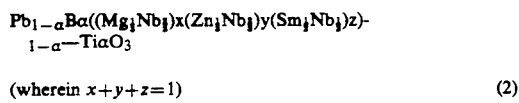

(wherein $x+y+z=1$)     (2)

However, when $BaTiO_3$ is added in an amount greater than 10 mol % or when the value $\alpha$ is greater than 0.1 in the general formula (2), the dielectric constant greatly decreases, which is not desirable.

According to the present invention, furthermore, $MnO_2$ is added at a ratio of 0.01 to 0.6% by weight and, particularly, at a ratio of 0.1 to 0.6% by weight to the above system in order to decrease the temperature dependence of the capacitance. This effect is small when the amount of $MnO_2$ is smaller than 0.01% by weight, and the dielectric constant decrease if this amount exceeds 0.6% by weight.

DETAILED DESCRIPTION OF THE PREFERRED EMBODIMENTS

Figure 1:
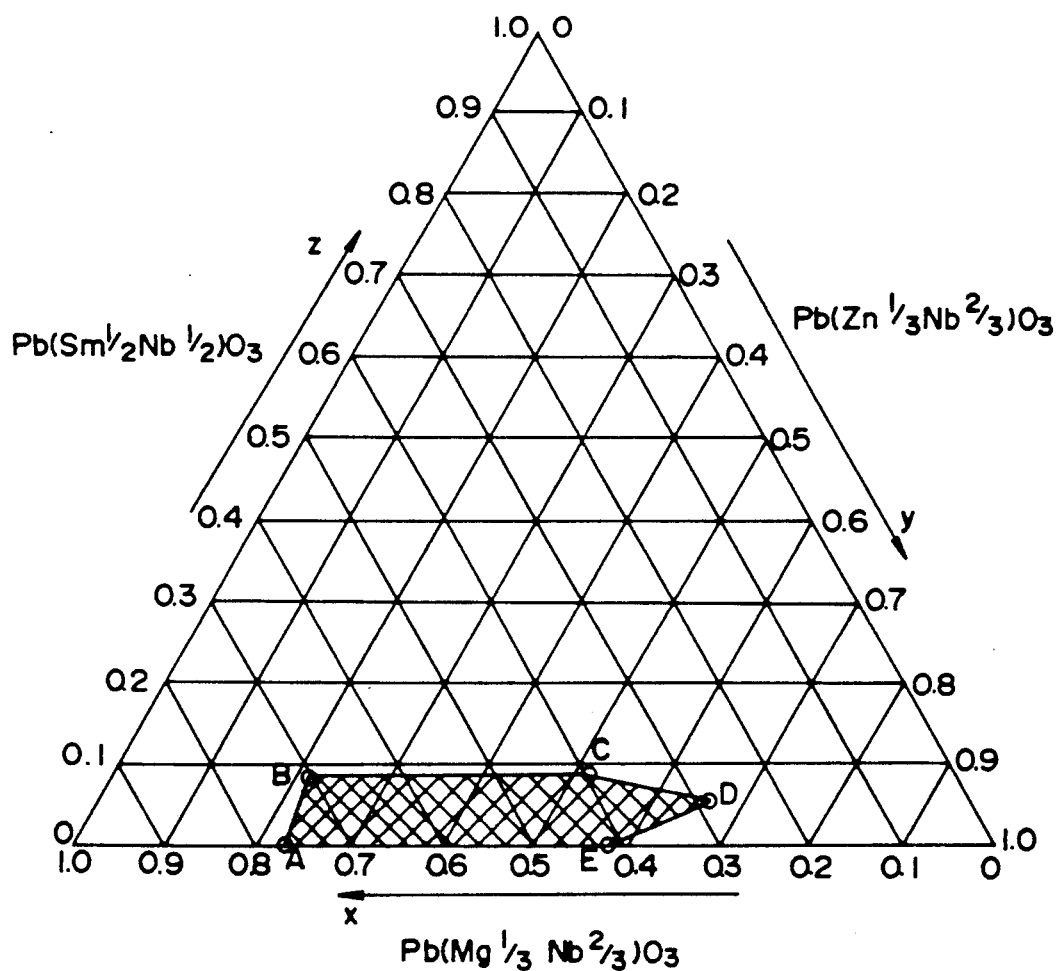
FIG. 1 is a triangular diagram of $Pb(Mg_\frac{1}{3}Nb_\frac{2}{3})O_3$, $Pb(Zn_\frac{1}{3}Nb_\frac{2}{3})O_3$ and $Pb(Sm_\frac{1}{2}Nb_\frac{1}{2})O_3$.

The dielectric ceramic composition of the present invention comprises $Pb(Mg_\frac{1}{3}Nb_\frac{2}{3})O_3$, $Pb(Zn_\frac{1}{3}Nb_\frac{2}{3})O_3$ and $Pb(Sm_\frac{1}{2}Nb_\frac{1}{2})O_3$ that are mixed at a predetermined ratio to exhibit a high dielectric constant, a high ceramic strength and a capacitance that changes little depending upon the temperature. When $BaTiO_3$ is added thereto, purity of crystals constituting the ceramic can be further enhanced to improve the insulating resistance thereof. Moreover, addition of $MnO_2$ thereto makes it possible to decrease the temperature dependence of the capacitance.

This makes it possible to obtain a dielectric ceramic having a dielectric constant k of greater than 4000, the dielectric constant changing over a temperature range of from −30° to 85° C. by an amount of from +30% to −60% compared with that at room temperature, and having a ceramic density of greater than 7.8 g/cm$^3$, the breaking mode of the ceramic being the intergranular mode, and further having high strength. The strength is about 6 to 8 kg/mm$^2$ when the breaking mode is the grain boundary mode but jumps up to about 10 to 12 kg/mm$^2$ when the breaking mode is the intergranular mode.

When the dielectric ceramic composition of the present invention is used, for example, for a multi layered ceramic capacitor (MLCC), there are obtained a capacitance that changes little depending upon the temperature and excellent strength of ceramic. Moreover, it is allowed to carry out the firing at a temperature lower than 1050° C. and to use a Pd material having a high Ag content as an internal electrode material and, hence, to obtain an MLCC at a reduced cost.

EXAMPLES

Powders of PbO, BaCO$_3$, ZnO, Sm$_2$O$_3$, Nb$_2$O$_5$, TiO$_2$ and MnO$_2$ were prepared as starting materials. These oxides possessed purities of higher than 99.5% and, particularly, Sm$_2$O$_3$ possessed a purity of higher than 99.9%.

The oxides were weighed such that the compositions shown in Tables 1, 2 and 3 were obtained, and that the total amount was 200 g, and were mixed together using a ball mill. The mixture was calcined in a crucible of Al$_2$O$_3$ at a temperature of 800° C. After calcining, the mixture was coarsely pulverized and was then pulverized in the ball mill using zirconia balls. Then, the vinyl alcohol was added thereto in an amount of 1% to granulate the mixture which was then molded with the application of pressure into a disk having a diameter of 12 mm and a thickness of about 1 mm. The disk-like molded article was put into a pot made of magnesia and was fired in the open air at 950° to 1050° C. for 4 hours.

In order to evaluate the electric properties of the obtained sintered product, a disk-like capacitor was prepared by placing an indium-gallium alloy on both main surfaces of the sintered product and was used as a sample.

The following items were examined as electric properties. The dielectric constant and dissipation factor DF were measured by using a digital LCR meter (4274 A manufactured by YHP) at a reference temperature of 25° C. by inputting signals of a frequency of 1 kHz and a measuring voltage of 1.0 Vrms. Temperature dependence of dielectric constant k was measured over a range of from −30° C. to +85° C. while using the dielectric constant k at +25° C. as a reference. The insulating resistance that was measured was a value of after a DC voltage of 50 V was applied for one minute. The dielectric constant k was calculated by taking the size of the sample into consideration, the CR product was calculated from the capacitance and the insulating resistance, and the ceramic density $\rho$ was found by measuring the bulk density.

Those having ceramic densities $\rho$ of greater than 7.80 g/cm$^3$ were evaluated to be of good quality.

This is because when the ceramic density $\rho$ is smaller than 7.80 g/cm$^3$, the capacitor exhibits small moisture resistance. The dielectric constant k is an important property for obtaining a capacitor which is small in size and has a high dielectric constant, and should be greater than 4000. The CR product should be greater than 2000 ΩF. When the CR product is smaller than 2000 ΩF, the life of the capacitor is shortened. The dielectric constant should not change greater than a range of from +30% to −60% over a temperature range of from −30° C. to 85° C. The strength is determined based upon the breaking mode: the strength is regarded to be acceptable when the breaking is taking place on the intergranule and is regarded to be not acceptable when the breaking is taking place on the grain boundary as a result of mechanical breakage. The dissipation factor DF is an important property for realizing a green sheet of a dielectric ceramic in a small thickness and for preparing an MLCC of a large capacitance.

The measured results were as shown in Tables 1, 2 and 3 which also show Curie temperatures and dielectric constants at Curie temperatures. The sample Nos. 13, 31, 34, 30 and 22 have coordinates (x, y, z) on the triangular diagram of FIG. 1 that are located on the coordinates A, B, C, D and E that define the range of the present invention. In the Tables, furthermore, sample numbers marked with * are comparative examples.

TABLE 1

| Sample No. | Composition of solid solution | | | | Firing temp. (°C.) | Density (g/cm$^3$) | Dielectric constant (k) | Dissipation factor D.F. (%) | CR product (ΩF) | Change of dielectric const. depending on temp. (%) | | | Max. dielectric const. | Curie temp. (°C.) | Strength |
|---|---|---|---|---|---|---|---|---|---|---|---|---|---|---|---|
| | x | y | z | α | | | | | | −30° C. | 85° C. | Max. | | | |
| 1* | 1.000 | 0 | 0 | 0 | 1000 | 7.85 | 10690 | 0.14 | 4050 | −15 | −58 | +37 | 14600 | −6 | X |
| 2* | 0.750 | 0.250 | 0 | 0 | 1000 | 7.95 | 19900 | 4.36 | 12400 | −78 | −55 | +8 | 21520 | +28 | X |
| 3 | 0.735 | 0.245 | 0.020 | 0 | 1000 | 7.91 | 13100 | 0.27 | 14200 | −58 | −53 | +11 | 14560 | +11 | O |
| 4 | 0.720 | 0.240 | 0.040 | 0 | 1000 | 7.91 | 8900 | 0.13 | 7030 | −36 | −47 | +20 | 16050 | −1 | O |
| 5 | 0.528 | 0.432 | 0.040 | 0 | 950 | 8.02 | 11200 | 1.89 | 8400 | −59 | −42 | 0 | 11200 | +21 | O |
| 6* | 0.500 | 0.500 | 0 | 0 | 1000 | 7.92 | 7400 | 5.96 | 600 | −68 | +72 | +93 | 14340 | +66 | X |
| 7 | 0.489 | 0.451 | 0.060 | 0 | 1000 | 7.92 | 7400 | 0.55 | 3160 | −45 | −38 | +5 | 7800 | +11 | O |
| 8* | 0.955 | 0.045 | 0 | 0.005 | 1000 | 7.85 | 11400 | 0.15 | 4180 | −26 | −56 | +30 | 14800 | −2 | X |
| 9* | 0.909 | 0.091 | 0 | 0.010 | 1000 | 7.91 | 12210 | 0.20 | 7500 | −37 | −55 | +21 | 14800 | +2 | X |
| 10 | 0.551 | 0.428 | 0.021 | 0.022 | 950 | 8.01 | 12930 | 3.31 | 10100 | −59 | 0 | 0 | 12930 | +25 | O |
| 11 | 0.511 | 0.448 | 0.041 | 0.023 | 950 | 8.01 | 9830 | 0.71 | 10750 | −48 | −41 | +4 | 10200 | +12 | O |
| 12 | 0.738 | 0.221 | 0.041 | 0.024 | 1000 | 7.88 | 7070 | 0.08 | 7840 | +10 | −43 | +27 | 9000 | −13 | O |
| 13* | 0.769 | 0.231 | 0 | 0.025 | 1000 | 7.90 | 12940 | 0.67 | 12940 | −52 | −49 | +7 | 13800 | +15 | X |
| 14 | 0.754 | 0.226 | 0.021 | 0.025 | 1000 | 7.87 | 9620 | 0.12 | 7600 | −19 | −47 | +22 | 11700 | −3 | O |
| 15* | 0.513 | 0.487 | 0 | 0.025 | 1000 | 8.00 | 11600 | 7.61 | 1950 | −66 | −12 | +27 | 14700 | +47 | X |

A mark * indicates samples that lie outside the scope of the present invention.

TABLE 2

| Sample No. | Composition of solid solution | | | | Firing temp. (°C.) | Density (g/cm³) | Dielectric constant (k) | Dissipation factor D.F. (%) | CR product (ΩF) | Change of dielectric const. depending on temp. (%) | | | Max. dielectric const. | Curie temp. (°C.) | Strength |
|---|---|---|---|---|---|---|---|---|---|---|---|---|---|---|---|
| | x | y | z | α | | | | | | −30° C. | 85° C. | Max. | | | |
| 16 | 0.444 | 0.494 | 0.062 | 0.025 | 1000 | 7.96 | 7110 | 0.28 | 4270 | −32 | −36 | +9 | 7800 | +6 | ○ |
| 17 | 0.453 | 0.506 | 0.041 | 0.026 | 950 | 7.97 | 10050 | 1.39 | 12150 | −54 | −39 | +1 | 10100 | +18 | ○ |
| 18 | 0.415 | 0.544 | 0.041 | 0.028 | 950 | 7.99 | 9220 | 2.51 | 8955 | −57 | −36 | +1 | 9300 | +25 | X |
| 19* | 0.290 | 0.680 | 0.010 | 0 | 1000 | 7.76 | 2120 | 4.21 | 300 | −49 | +181 | — | — | — | X |
| 20* | 0.833 | 0.167 | 0 | 0.100 | 1050 | 7.84 | 5920 | 0.10 | 11250 | +30 | −40 | +22 | 7600 | −28 | X |
| 21* | 0.625 | 0.375 | 0 | 0.200 | 1050 | 7.65 | 3880 | 0.05 | 6940 | +30 | +32 | +28 | 5400 | −45 | X |
| 22* | 0.417 | 0.583 | 0 | 0.280 | 1050 | 7.57 | 3150 | 0.06 | 8480 | +29 | −31 | +27 | 4300 | −45 | ○ |
| 23* | 0.815 | 0.163 | 0.022 | 0.098 | 1050 | 7.75 | 4863 | 0.03 | 4860 | +39 | −40 | +30 | 6900 | −38 | ○ |
| 24* | 0.610 | 0.366 | 0.025 | 0.196 | 1050 | 7.59 | 3170 | 0.09 | 9170 | +28 | −31 | +26 | 4300 | +45 | ○ |
| 25* | 0.797 | 0.159 | 0.044 | 0.096 | 1050 | 7.76 | 4200 | 0.01 | 7890 | +39 | −38 | +28 | 5800 | +47 | ○ |
| 26* | 0.594 | 0.356 | 0.050 | 0.192 | 1050 | 7.62 | 2630 | 0.05 | 4280 | +29 | −32 | +25 | 3500 | +45 | ○ |
| 27 | 0.381 | 0.575 | 0.044 | 0.092 | 1030 | 7.91 | 6400 | 0.44 | 4900 | −13 | −34 | +11 | 7100 | 0 | ○ |
| 28 | 0.413 | 0.534 | 0.053 | 0.056 | 1030 | 7.94 | 6870 | 0.47 | 7500 | −25 | −36 | +9 | 7490 | +4 | ○ |
| 29 | 0.341 | 0.595 | 0.064 | 0.062 | 1030 | 7.94 | 6310 | 0.44 | 7300 | −24 | −34 | +8 | 6810 | +4 | ○ |
| 30 | 0.282 | 0.658 | 0.060 | 0 | 950 | 7.99 | 5980 | 0.38 | 7740 | −34 | −35 | +2 | 6100 | +9 | ○ |
| 31 | 0.706 | 0.212 | 0.082 | 0.023 | 1000 | 7.80 | 4320 | 0.06 | 5130 | +29 | −37 | +30 | 5600 | +26 | ○ |

A mark * indicates samples that lie outside the scope of the present invention.

TABLE 3

| Sample No. | Composition of solid solution | | | | Firing temp. (°C.) | Density (g/cm³) | Dielectric constant (k) | Dissipation factor D.F. (%) | CR product (ΩF) | Change of dielectric const. depending on temp. (%) | | | Max. dielectric const. | Curie temp. (°C.) | Strength |
|---|---|---|---|---|---|---|---|---|---|---|---|---|---|---|---|
| | x | y | z | α | | | | | | −30° C. | 85° C. | Max. | | | |
| 32 | 0.482 | 0.434 | 0.084 | 0.046 | 1000 | 7.88 | 4200 | 0.15 | 15000 | +14 | −34 | +19 | 5000 | −18 | ○ |
| 33 | 0.460 | 0.460 | 0.080 | 0 | 1000 | 7.84 | 4560 | 0.36 | 2500 | −43 | −36 | +6 | 4830 | +9 | ○ |
| 34* | 0.399 | 0.517 | 0.084 | 0.054 | 1000 | 7.92 | 4600 | 0.14 | 3880 | +3 | −33 | +9 | 5000 | −10 | ○ |
| 35 | 0.573 | 0.406 | 0.021 | 0.043 | 1000 | 7.88 | 11170 | 0.61 | 7570 | −49 | −44 | +6 | 11840 | +13 | ○ |
| 36 | 0.542 | 0.416 | 0.042 | 0.044 | 1000 | 7.95 | 7850 | 0.26 | 16300 | −21 | −40 | +10 | 8700 | 0 | ○ |
| 37 | 0.535 | 0.444 | 0.021 | 0.047 | 1000 | 7.81 | 10860 | 0.77 | 3410 | −50 | −43 | +5 | 11400 | +15 | ○ |
| 38 | 0.504 | 0.454 | 0.042 | 0.048 | 1000 | 7.92 | 7520 | 0.27 | 10000 | −25 | −38 | +9 | 8200 | +2 | ○ |
| 39 | 0.515 | 0.464 | 0.021 | 0.049 | 1000 | 7.93 | 10600 | 0.80 | 12000 | −49 | −41 | +5 | 11100 | +13 | ○ |
| 40* | 0.526 | 0.474 | 0 | 0.050 | 1000 | 7.90 | 12000 | 3.97 | 5300 | −60 | −35 | +1 | 12100 | +30 | X |
| 41 | 0.472 | 0.434 | 0.094 | 0.048 | 1000 | 7.88 | 3830 | 0.12 | 12000 | +24 | −38 | +19 | 4560 | −24 | ○ |
| 42 | 0.520 | 0.469 | 0.011 | 0.050 | 1000 | 7.95 | 12310 | 1.77 | 15000 | −57 | −42 | +1 | 12400 | +17 | ○ |
| 43 | 0.466 | 0.492 | 0.042 | 0.052 | 1000 | 7.92 | 7780 | 0.44 | 6770 | −35 | −38 | +7 | 8320 | +9 | ○ |
| 44 | 0.476 | 0.503 | 0.021 | 0.053 | 1000 | 7.87 | 11280 | 1.50 | 15230 | −55 | −40 | +1 | 11400 | +20 | ○ |
| 45 | 0.427 | 0.531 | 0.042 | 0.056 | 1000 | 7.86 | 11310 | 1.94 | 12360 | −56 | −37 | +1 | 11400 | +22 | ○ |
| 46 | 0.437 | 0.542 | 0.021 | 0.057 | 1000 | 7.90 | 8000 | 0.38 | 18360 | −34 | −37 | +8 | 8640 | +7 | ○ |
| 47 | 0.368 | 0.589 | 0.043 | 0.061 | 1030 | 7.93 | 8300 | 0.97 | 8000 | −41 | −36 | +4 | 8630 | +14 | ○ |

A mark * indicates samples that lie outside the scope of the present invention.

TABLE 4

| Sample No. | Composition of solid solution | | | | Amount of MnO₂ (wt %) | Firing temp. (°C.) | Density (g/cm³) | Dielectric constant (k) | Dissipation factor D.F. (%) | CR product (ΩF) | Temperature coefficient (%) | | | Max. dielectric const. | Curie temp. (°C.) | Strength |
|---|---|---|---|---|---|---|---|---|---|---|---|---|---|---|---|---|
| | x | y | z | α | | | | | | | −30° C. | 85° C. | Max. | | | |
| 48 | 0.413 | 0.534 | 0.053 | 0.058 | — | 1000 | 7.87 | 6730 | 0.39 | 5700 | −23 | −36 | +10 | 7490 | +3 | |
| 49 | " | " | " | " | 0.02 | 1030 | 7.84 | 6350 | 0.33 | 13700 | −19 | −36 | +10 | 7200 | +4 | |
| 50 | " | " | " | " | 0.02 | 1000 | 7.83 | 6530 | 0.34 | 18200 | −19 | −36 | +10 | 7200 | +4 | |
| 51 | " | " | " | " | 0.05 | 1030 | 7.84 | 6090 | 0.28 | 10600 | −18 | −35 | +9 | 6900 | +3 | |
| 52 | " | " | " | " | 0.05 | 1000 | 7.82 | 6320 | 0.30 | 9500 | −18 | −35 | +9 | 6900 | +3 | |
| 53 | " | " | " | " | 0.10 | 1030 | 7.88 | 5790 | 0.27 | 7700 | −15 | −32 | +7 | 6400 | +3 | |
| 54 | " | " | " | " | 0.10 | 1000 | 7.84 | 5990 | 0.24 | 6700 | −15 | −32 | +7 | 6400 | +3 | |
| 55 | " | " | " | " | 0.20 | 1030 | 7.89 | 4850 | 0.32 | 2900 | −14 | −26 | +6 | 5300 | +15 | |
| 56 | " | " | " | " | 0.20 | 1000 | 7.85 | 5030 | 0.28 | 2900 | −14 | −26 | +6 | 5300 | +15 | |
| 57 | 0.392 | 0.5292 | 0.020 | 0.0588 | 0 | 1000 | 7.88 | 11910 | 1.77 | 6920 | −50 | −39 | +3 | 12270 | +27 | |
| 58 | " | " | " | " | 0.20 | 1000 | 7.81 | 6810 | 0.43 | 4600 | −30 | −13 | +9 | 7420 | +32 | |
| 59 | " | " | " | " | 0.40 | 1000 | 7.84 | 5260 | 0.49 | 4200 | −28 | −3 | +12 | 5890 | +34 | |
| 60 | " | " | " | " | 0.60 | 1000 | 7.86 | 4400 | 0.62 | 3800 | −21 | −1.2 | +12 | 4930 | +38 | |
| 61* | " | " | " | " | 0.70 | 1000 | 7.82 | 3660 | 0.60 | 3600 | −18 | +0.9 | +9 | 3990 | +40 | |
| 62 | 0.490 | 0.441 | 0.020 | 0.049 | 0 | 1000 | 7.91 | 11450 | 0.76 | 9160 | −45 | −43 | +14 | 13050 | +17 | |
| 63 | " | " | " | " | 0.05 | 1000 | 8.03 | 10700 | 0.37 | 10790 | −37 | −39 | +12 | 12000 | +18 | |
| 64 | " | " | " | " | 0.10 | 1000 | 8.02 | 9628 | 0.28 | 9520 | −31 | −23 | +11 | 10690 | +18 | |
| 65 | " | " | " | " | 0.15 | 1000 | 8.00 | 8387 | 0.29 | 5990 | −27 | −21 | +2 | 8550 | +23 | |
| 66 | " | " | " | " | 0.20 | 1000 | 8.00 | 7597 | 0.34 | 4740 | −26 | −20 | +1 | 7590 | +26 | |

A mark * indicates samples that lie outside the scope of the present invention.

When the values x, y and z lie within the range of the present invention but BaTiO$_3$ is contained in an amount greater than 10 mol% as in the cases of sample Nos. 24 and 26, the ceramic densities become 7.59 g/cm$^3$, 7.62 g/cm$^3$, and the dielectric constant k become 3170, 2630; i.e., the dielectric constants are greatly decreased. Therefore, BaTiO$_3$ should in an amount which is not greater than 10 mol%.

When is smaller than 10 mol % but when the coordinates x, y, z greatly exceed the segment AB of FIG. 1 as in the cases of sample Nos. 23 and 25, the ceramic densities become 7.75 g/cm$^3$ and 7.76 g/cm$^3$, and the capacitance changes greatly from that at ordinary temperature.

When the coordinates x, y, z exceed the segment BC of FIG. 1 the dielectric constant greatly decreases even though is smaller than 10 mol% as in the case of sample No. 41.

When the coordinates x, y, z exceed the segments CD and DE though α is smaller than 10 mol% as in the case of sample No. 19, the ceramic density becomes 7.76 g/cm$^3$, the dielectric constant k becomes 2120, the dissipation factor becomes 4.21%, the dielectric constant at 85° C. changes by +181%, and the breaking mode becomes the grain boundary mode, and the dielectric ceramic cannot be put into practical use.

Moreover, when the coordinates x, y, z are on the segment AE (z =0) as in the cases of sample Nos. 1, 2, 6, 8, 9, 13, 15, 21, 22 and 40, the breaking mode becomes that of the grain boundary mode despite α is smaller than 10 mol %, and the ceramic strength is not obtained to a sufficient degree. Furthermore, even when the coordinate lies at the central region of the coordinates A, B, C, D, E as will be understood from sample No. 6, the dissipation factor becomes as very great as 5.96% if z is 0, and the dielectric constant changes very greatly depending upon the temperature.

It is therefore important to set the coordinates x, y, z in the general formula (1) to lie within the range of the present invention and to add BaTiO$_3$ to the composition in an amount of smaller than 10 mol % in order to obtain a dielectric ceramic composition having a dielectric constnat k of greater than 4000, the dielectric constant changing over a temperature range of from 30° to 85° C. by from +30% to −60% compared to that at room temperature, and having a ceramic density of greater than 7.8 g/cm$^3$, the breaking mode of the ceramic being intergranular mode, and having a favorable ceramic strength.

According to Table 4, the absolute value of temperature dependence decreases with an increase in the amount of MnO$_2$ over a range of from 0.01% by weight to 0.6% by weight as manifested by sample Nos. 48–56, 57–60, and 62–66, and the temperature characteristics are improved by the addition of MnO$_2$. In the case of sample No. 61 in which the amount of MnO$_2$ exceeds 0.6% by weight, however, the dielectric constant decreases and the properties are deteriorated.

EFFECT OF THE INVENTION

The dielectric ceramic composition of the present invention makes it possible to obtain a dielectric ceramic that has a high dielectric constant, a small dissipation factor, a temperature more stable of dielectric constant that changes little depending upon the temperature, a good ceramic density and good ceramic strength, and that can be fired at a low temperature, lending itself well for use in MLCC using Ag-Pd electrodes.

We claim:

1. A dielectric ceramic composition comprising Pb(Mg$_{\frac{1}{3}}$Nb$_{\frac{2}{3}}$)O$_3$, Pb(Zn$_{\frac{1}{3}}$Nb$_{\frac{2}{3}}$)O$_3$ and Pb(Sm$_{\frac{1}{2}}$Nb$_{\frac{1}{2}}$)O$_3$, wherein when the ratio of these components is represented by $$xPb(Mg_{\frac{1}{3}}Nb_{\frac{2}{3}})O_3 - yPb(Zn_{\frac{1}{3}}Nb_{\frac{2}{3}})O_3 - zPb(Sm_{\frac{1}{2}}Nb_{\frac{1}{2}})O_3$$

(wherein $x+y+z=1$)     (1)

the values x, y and z lie inside the following coordinates A, B, C, D and E (but excluding the segment AE) in a triangular diagram of FIG. 1, A (0.769, 0.231, 0),
B (0.706, 0.212, 0.082),
C (0.399, 0.517, 0.084),
D (0 282, 0.658, 0.060),
E (0.417, 0.583, 0)

2. A dielectric ceramic composition according to claim 1, wherein BaTiO$_3$ is added at a ratio of smaller than 10 mol%.

3. A dielectric ceramic composition according to claim 1 or 2, wherein MnO$_2$ is added at a ratio of 0.01 to 0.6% by weight.

* * * * *